United States Patent
Peyton et al.

(10) Patent No.: US 9,562,986 B2
(45) Date of Patent: Feb. 7, 2017

(54) WALK THROUGH METAL DETECTION SYSTEM

(75) Inventors: Anthony J. Peyton, Bolton (GB);
David W. Armitage, Malpas (GB);
Liam A. Marsh, Stockport (GB);
Christos Ktistis, Warrington (GB);
William Robert Breckon Lionheart,
High Peak (GB); Ari Järvi, Espoo (FI)

(73) Assignee: Rapiscan Systems, Inc., Torrance, CA (US)

( * ) Notice: Subject to any disclaimer, the term of this patent is extended or adjusted under 35 U.S.C. 154(b) by 259 days.

(21) Appl. No.: 13/175,785

(22) Filed: Jul. 1, 2011

(65) Prior Publication Data
US 2013/0006552 A1    Jan. 3, 2013

(51) Int. Cl.
G01R 33/00    (2006.01)
G01V 3/12    (2006.01)
G01V 3/10    (2006.01)

(52) U.S. Cl.
CPC ...... *G01V 3/12* (2013.01); *G01V 3/105* (2013.01)

(58) Field of Classification Search
CPC ........ G01V 3/12; G01V 5/0025; G01V 3/104; G01V 5/0008; G01V 3/105; G01N 23/04; G01N 27/72
USPC .............................. 702/57, 38, 115; 324/244
See application file for complete search history.

(56) References Cited

U.S. PATENT DOCUMENTS

| | | |
|---|---|---|
| 4,906,973 A | 3/1990 | Karbowski et al. |
| 5,493,517 A | 2/1996 | Frazier |
| 5,790,685 A | 8/1998 | Sallee |
| 5,808,760 A * | 9/1998 | Gfeller ........................ 398/27 |
| 6,094,472 A | 7/2000 | Smith |

(Continued)

FOREIGN PATENT DOCUMENTS

| | | |
|---|---|---|
| DE | 2161138 | 6/1973 |
| DE | 342106 | 1/1986 |

(Continued)

OTHER PUBLICATIONS

Podosenov, Stanislav A., Method for Determining the Electric and Magnetic Polarizability of Arbitrarily Shaped Conducting Bodies., Feb. 1997, IEEE Transactions on Electomagnetic Compatibility vol. 39 No. 1, pp. 1-10.*

(Continued)

*Primary Examiner* — Gregory J Toatley
*Assistant Examiner* — Yoshihisa Ishizuka
(74) *Attorney, Agent, or Firm* — Novel IP; Hazim Ansari; Sona Dalal (57) ABSTRACT

The present application is a detection system for locating and characterizing an object placed in a detection area in a three dimensional space. The detection system includes a plurality of magnetic field generators and magnetic field detectors arranged on opposite sides of the detection area and a control system for enabling generation of a magnetic field in the detection area by the magnetic field generators and for measuring of the magnetic field modified by the object at each of the magnetic field detectors. The detection system also includes a processor for processing the measured magnetic field to obtain a data set characterizing the object and a location of the object. The processor applies a reconstruction process on a predefined number of measurements of the modified magnetic field.

19 Claims, 6 Drawing Sheets

(56) References Cited

U.S. PATENT DOCUMENTS

| | | |
|---|---|---|
| 6,665,373 B1 | 12/2003 | Kotowski et al. |
| 6,831,603 B2 | 12/2004 | Menache |
| 7,110,493 B1 | 9/2006 | Kotowski et al. |
| 7,143,004 B2 | 11/2006 | Townsend et al. |
| 7,218,105 B2 | 5/2007 | Chisholm et al. |
| 7,257,189 B2 | 8/2007 | Modica et al. |
| 7,366,282 B2 | 4/2008 | Peschmann |
| 7,417,440 B2 | 8/2008 | Peschmann et al. |
| 7,418,077 B2 | 8/2008 | Gray |
| 7,505,557 B2 | 3/2009 | Modica et al. |
| 7,545,140 B2 | 6/2009 | Humphreys et al. |
| 7,579,845 B2 | 8/2009 | Peschmann et al. |
| 7,659,851 B2 | 2/2010 | DeJean et al. |
| 7,660,388 B2 | 2/2010 | Gray |
| 7,796,733 B2 | 9/2010 | Hughes |
| 7,826,589 B2 | 11/2010 | Kotowski et al. |
| 7,856,081 B2 | 12/2010 | Peschmann |
| 7,903,783 B2 | 3/2011 | Modica et al. |
| 7,999,541 B2 | 8/2011 | Chisholm et al. |
| 8,135,112 B2 | 3/2012 | Hughes |
| 8,138,770 B2 | 3/2012 | Peschmann et al. |
| 8,199,996 B2 | 6/2012 | Hughes |
| 8,428,217 B2 | 4/2013 | Peschmann |
| 8,471,558 B2 | 6/2013 | Chisholm et al. |
| 8,498,376 B2 | 7/2013 | Modica et al. |
| 8,552,722 B2 | 10/2013 | Lionheart et al. |
| 8,576,982 B2 | 11/2013 | Gray et al. |
| 8,576,989 B2 | 11/2013 | Kaminski |
| 2002/0005297 A1* | 1/2002 | Alft et al. .................. 175/26 |
| 2004/0080315 A1* | 4/2004 | Beevor et al. ............. 324/244 |
| 2008/0054893 A1* | 3/2008 | Humphreys et al. ....... 324/239 |
| 2009/0278683 A1 | 11/2009 | Carter |
| 2010/0067005 A1* | 3/2010 | Davis et al. ................ 356/337 |

FOREIGN PATENT DOCUMENTS

| | | | |
|---|---|---|---|
| GB | 2199715 | 7/1988 | |
| WO | WO/90/05299 | 5/1990 | |
| WO | WO 9701771 A1 * | 1/1997 | ............... G01V 3/10 |
| WO | WO/2013/006373 | 1/2013 | |

OTHER PUBLICATIONS

International Search Report PCT/US2012/044632, mailed on Oct. 26, 2012, Rapiscan Systems Inc.

* cited by examiner

```
Elapsed Time is 3.590403 Seconds.
Xhat =
   0.3359 - 0.1893i    -0.1901 + 0.0346i    -0.1585 + 0.0096i
  -0.1901 + 0.0346i     0.8579 + 0.0162i     0.0550 - 0.0299i
  -0.1585 + 0.0096i     0.0550 - 0.0299i     0.3284 - 0.1227i 0.9180 - 0.0406i
   0.1619 - 0.1451i
   0.4423 - 0.1101i
Video Path Saved
```

WALK THROUGH METAL DETECTION SYSTEM

FIELD OF THE INVENTION

The present application relates to electromagnetic (EM) inspection/detection systems. More particularly, the present application relates to a system for locating and characterizing a metal object located on a person.

BACKGROUND

Walk-through metal detectors (WTMDs) comprising an array of transmitter coils and an array of detector coils are well known and widely used for screening of personnel at secure locations such as airports, prisons, government buildings and the like. WTMDs typically operate using coupling between pairs of coils, providing a multi-zone system with a coil pair for each zone, each pair operating as an independent metal detector. In conventional systems, the transmitter coils are typically located in one panel whereas the receiver coils are located in an opposite panel, wherein the two panels comprise a walk-through portal or "hallway".

While such systems are capable of detecting the presence of metal objects, they are limited in their ability to discriminate between different types of metal objects or accurately locate metal objects on the subject. Although there have been attempts to produce imaging metal detectors and even tomographic metal detectors that can address these concerns, these systems are limited due to the poor quality of the images that they produce. In general, such imaging systems do not produce images with sufficient quality to reliably discern the shape of the object. In addition, these conventional metal detection systems may not produce good results because they attempt to represent the metal object with a two-dimensional response. It should be appreciated by those of ordinary skill in the art that a metal object has an inherent three dimensional response that is not taken account by employing a simple two-dimensional approach.

The limitations of currently available metal detectors are well known, such as the low sensitivity to low conductivity, non-magnetic metals, e.g. titanium, and false positives caused by innocuous objects, which, in turn, result in longer queues at checkpoints and borders. In recent times, X-ray backscatter imaging techniques and systems and some millimeter-wave scanning methods and systems are becoming more widely deployed. However, these are high performance, high cost systems which are only suited to specific screening applications and there are issues, such as negative public perceptions regarding radiation exposure and/or an invasion of privacy, relating to their use.

Therefore, what is needed is a metal detection system that is capable of characterizing and locating the position of hidden objects by combining spectroscopic, tomographic and ultra-wide band techniques.

There is also a need for a new generation of electromagnetic screening equipment for detecting metallic objects which addresses the limitations of prior art, and also has minimal impact on the environment.

SUMMARY OF THE INVENTION

In one embodiment, the present application discloses a detection system for characterizing and locating one or more metal objects in three-dimensional space by using electromagnetic characteristics of the objects.

In another embodiment, the present application discloses a method for classifying a metal object detected by the detection system described above into defined classes using the electromagnetic characteristics.

In yet another embodiment, an electromagnetic characteristic of a metal object, such as the magnetic polarisability dyadic, is estimated using a novel coil configuration.

In still yet another embodiment, a reconstruction algorithm is employed for calculating at least one electromagnetic characteristic of the metal object, such as the magnetic polarisability dyadic.

In one embodiment, the present application discloses a detection system for locating and characterizing an object within a detection area in a three-dimensional space comprising a plurality of magnetic field generators arranged on at least a first side of the detection area; a plurality of magnetic field detectors, arranged on at least a second side of the detection area, wherein the second side is opposite to the first side; a control system for generating a magnetic field in the detection area by the magnetic field generators and for measuring a modified magnetic field at each of the magnetic field detectors, wherein the generated magnetic field is modified by the object; and at least one processor configured to process the measured modified magnetic field to obtain a data set characterizing the object and a location of the object, wherein said at least one processor is configured to execute a plurality of instructions defining a reconstruction process on a predefined number of measurements of the modified magnetic field.

Optionally, the detection system further comprises an alarm generation unit for generating an alarm corresponding to at least one predefined type of object based on one or more parameters in the characteristic data of the object, wherein the alarm generation module is adapted to execute a classification process for determining the type of the object based on one or more predefined categories associated with the object. The detection system further comprises a movement sensor arranged to measure a position of at least a first part of the object relative to at least one of the magnetic field generators, the magnetic field detectors, or another part of the object, wherein the measured position is combined with the data set characterizing the object. The movement sensor comprises a motion sensor or a video camera. The movement sensor comprises a light sensor. The movement sensor produces a visual output displaying one or more of a measured position and a category of the object passing through the detection area, wherein the visual output is obtained by combining a photographic image of the object with at least a portion of the data set characterizing the object and the measured position of at least a part of the object.

Optionally, the detection further comprises a displacement sensor configured to detect a displacement of at least a part of the object away from a reference position, and to correct for the displacement when processing sets of measurements of the modified magnetic field, wherein the reference position is relative to at least a part of the object and the displacement is relative to at least a part of the object. The object is a conductor of electricity. The object is a ferromagnetic object. The magnetic field generators are electrical conductor coils through which electric current is passed to generate magnetic field. The magnetic field detectors are electrical conductor coils in which electric current is generated due to changes in a magnetic field. The magnetic field detectors are solid state magnetometers. The at least one processor reconstructs a path followed by the object in three dimensional space. The control system generates a magnetic field by generating electrical current in the magnetic field generators and measures the magnetic field at each of the magnetic field detectors by detecting induced signals in the detectors. The control system comprises one or more data acquisition and conditioning electronics for collecting conditioned signals from the magnetic field detectors and at least one processor for possessing the collected conditioned signals to generate images.

Optionally, the detection system further comprises at least one processor adapted to process at least a video signal obtained from one or more video cameras placed around the detection area. The data set for characterizing the object comprises one or more electromagnetic properties of the object and a sequence of coordinate points that describe a path the object has traveled inside the detection area. The data set for characterizing the object comprises a complex magnetic polarisability dyadic of the object, wherein the magnetic polarisability dyadic describes a three-dimensional scattering effect of the object with respect to the generated magnetic field. The magnetic field generators and detectors are each configured in an array for obtaining near zero background coupling and low susceptibility to mechanical movement.

In another embodiment, the present application discloses a method for locating and characterizing an object within a detection area in a three-dimensional space comprising: providing a walk through the detection area, which comprises a plurality of magnetic field generators arranged on at least a first side of the detection area and a plurality of magnetic field detectors, arranged on at least a second side of the detection area, the second side being opposite and parallel to the first side; generating a magnetic field in the detection area by the magnetic field generators; measuring a modified magnetic field at each of the magnetic field detectors, wherein the generated magnetic field is modified by the object; and processing the measured magnetic field to obtain a data set characterizing the object and a location of the object, wherein a reconstruction process is applied to a predefined number of measurements of the modified magnetic field.

Optionally, the method further comprises measuring a position of at least a first part of the object relative to at least one of the magnetic field generators, the magnetic field detectors, or another part of the object, wherein the measured position is combined with the data set characterizing the object. The method further comprises producing a visual output using a movement sensor that shows one or more of a measured position and a category of the object passing through the detection area, wherein the visual output is obtained by combining a photographic image of the object with characteristics of the data set of the object and with the measured position of at least a part of the object. The method further comprises a) detecting a displacement of at least a part of the object away from a reference position and b) correcting for the displacement when combining sets of measurements of the modified magnetic field, wherein the reference position is relative to at least a part of the object and the displacement is relative to at least a part of the object.

The aforementioned and other embodiments of the present shall be described in greater depth in the drawings and detailed description provided below.

BRIEF DESCRIPTION OF THE DRAWINGS

These and other features and advantages of the present application will be further appreciated, as they become better understood by reference to the detailed description when considered in connection with the accompanying drawings, wherein.

DETAILED DESCRIPTION OF THE INVENTION

The present application discloses multiple embodiments. The following disclosure is provided in order to enable a person having ordinary skill in the art to practice the claimed inventions. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present application is to be accorded the widest scope encompassing numerous alternatives, modifications and equivalents consistent with the principles and features disclosed. For purpose of clarity, details relating to technical material that is known in the technical fields related to the claimed inventions have not been described in detail so as not to unnecessarily obscure the disclosure.

In one embodiment, the present application discloses a personnel screening and inspection system that is capable of detecting, characterizing and locating a metallic object in three-dimensional space.

In one embodiment, the present application discloses a detection system for characterizing and locating one or more metal objects in three-dimensional space by using electromagnetic characteristics of the objects.

In one embodiment, the present application discloses a detection system comprising a plurality of magnetic field generators which, in one embodiment, are transmitter coils and a plurality of magnetic field detectors, which, in one embodiment, are receiver coils, located around a detection area defining a portal through which a subject stands or walks, and a control system that is arranged to generate magnetic field and measure the generated magnetic field at each of the detectors. In one embodiment, the magnetic field is generated by generating electrical current in the transmitter coils. In one embodiment, the magnetic field is measured by detecting induced signals in the receiver coils.

In an embodiment, the object to be detected is a conductor of electricity. In another embodiment, the object is a ferromagnetic object. Further, in yet another embodiment, the magnetic field generators are electrical conductor coils through which electric current is passed to generate magnetic field; and the magnetic field detectors are electrical conductor coils in which electric voltage is generated due to changes in a magnetic field, thereby enabling the magnetic field to be measured. In another embodiment, the magnetic field detectors are solid state magnetometers.

In another embodiment, the present application discloses a method for classifying a metal object detected by the detection system described above into defined classes using the electromagnetic characteristics.

In yet another embodiment, an electromagnetic characteristic of a metal object, such as the magnetic polarisability dyadic, is estimated using a novel coil configuration.

In still yet another embodiment, a reconstruction algorithm is employed for calculating at least one electromagnetic characteristic of the metal object, such as the magnetic polarisability dyadic.

In one embodiment, the present application discloses a detection system for characterizing and locating one or more metal objects in three-dimensional space by using electromagnetic characteristics of the objects further comprising at least one processor configured to process measurements of a generated field by, for example, measuring the induced signals to generate a data set characterizing one or more of the detected objects, together with their location, as they pass through or across the sensitive region of the inspection system.

The at least one processor or processing means refers to a processing device, such as a chip, semiconductor, or any other processor, that is configured to access a memory storing a plurality of instructions defining a reconstruction method and to execute the plurality of instructions in order to reconstruct the characteristics of each object, and, if required, the path each object has taken through space.

In one embodiment, the data set for characterizing the object comprises one or more electromagnetic properties of the object, and a sequence of coordinate points that describe the path the object has traveled inside the detection area. The data set for characterizing the object comprises a complex magnetic polarisability dyadic of the object, whereby the magnetic polarisability dyadic describes a three-dimensional scattering effect of the object with respect to the generated magnetic field. Further, in an embodiment, the magnetic field generators and detectors are each configured in an array for obtaining near zero background coupling and low susceptibility to mechanical movement.

Figure 1:
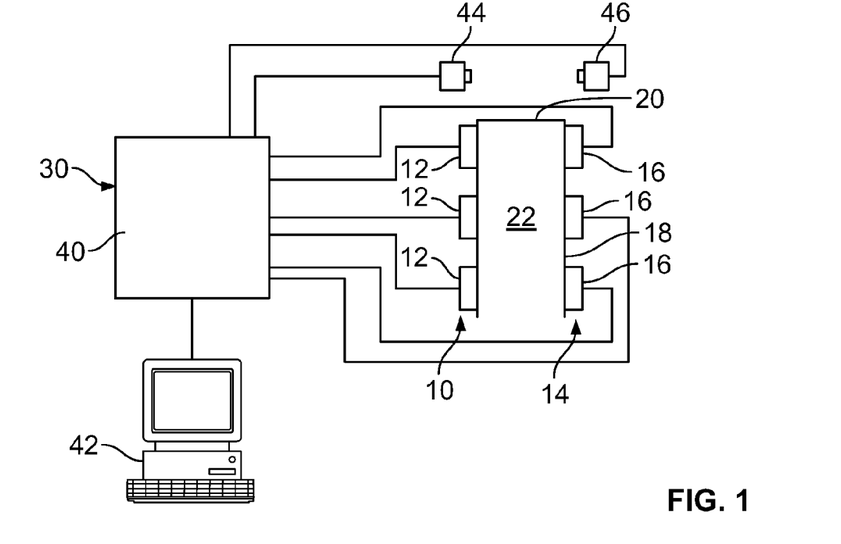
FIG. 1 is a schematic diagram of a detection system, in accordance with an embodiment.

FIG. 1 is a schematic diagram of a detection system, in accordance with one embodiment of the present invention. The detection system comprises an array 10 of magnetic field generator coils 12 and an array 14 of magnetic field detector coils 16. As illustrated, the arrays 10, 14 are arranged on opposite sides of a support frame 18 which defines an arch, portal or gate 20, within which is an imaging area 22 through which a person can walk. In one embodiment, a plurality of magnetic field generators 12 is arranged on at least a first side of the detection area. In one embodiment, a plurality of magnetic field detectors 14 is arranged on at least a second side of the detection area, the second side being opposite to and/or parallel to the first side. The detection system thus comprises an array 10 of transmitter coils 12 and an array 14 of receiver coils 16.

In the embodiment illustrated in FIG. 1, there are equal numbers of transmitter coils 12 and receiver coils 16, with each transmitter coil 12 being level with, opposite to, and/or parallel to a respective receiver coil 16. In one embodiment, there are eight transmitter coils 12 and eight receiver coils 16. It should be understood by those of ordinary skill in the art that any number of receiver coils may be employed without departing from the scope of the present application. In the embodiment described herein, but not limited to such embodiment, the transmitter and receiver coils are also equally spaced within the panels.

In alternate embodiments, various other coil configurations may be employed, such as different numbers of transmitters and receiver coils; using transmitter and/or receiver coils of different sizes; using transmitter and/or receiver coils of different orientations; using transmitter and receiver coils of different geometries, which will be described in greater detail below; and positioning the coils with unequal spacing, for example, positioning a greater number of coils near the floor level to enhance the characterization of a metallic objects carried in a subject's shoes.

A control system 30 is arranged to generate and control a varying electrical current independently in each of the transmitter coils 12, thus generating a magnetic field. In an embodiment, the control system 30 measures signals generated in each of the receiver coils 16 due to the generated magnetic field in the form of electrical currents. The control system 30 comprises data acquisition and conditioning electronics 40 and a processing system 42, which, in one embodiment, is a host computer. The data acquisition and conditioning electronics 40 collects data from the receiver coils 16, and the processing system 42 processes the collected conditioned signals to generate images and executes instructions to perform detection methods. In one embodiment, detection system also comprises camera 44 and camera 46 to generate images of the imaging area 22, described in greater detail below.

Figure 2:
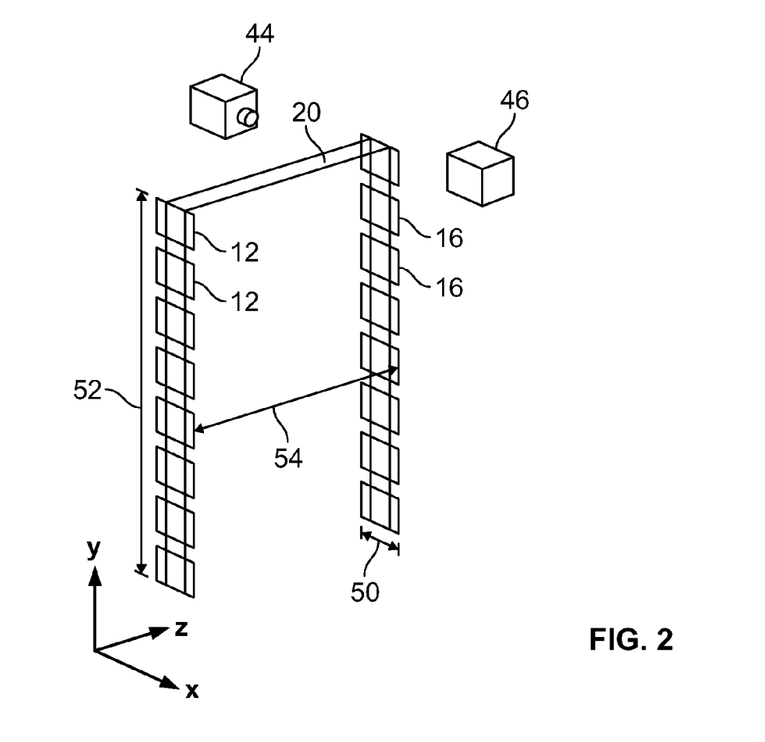
FIG. 2 illustrates a more detailed, magnified view of a portion of the detection system depicted in FIG. 1.

FIG. 2 illustrates a magnified view of a portion of the detection system depicted in FIG. 1. Referring to both FIGS. 1 and 2 interchangeably, the detection system further comprises four video cameras, two cameras 44 and 46 positioned on each side of the gate 20 and two (not shown in FIG. 1 or 2) positioned overhead on each side of the gate 20 for providing a bird's eye view. The two cameras 44, 46 are orientated so that they both image the imaging area 22 from different angles, as illustrated in FIG. 2, and thus provide front and rear views of a subject walking through the imaging area 22 to determine the position of the subject passing through the gate 20.

In various embodiments, any number of cameras may be used to improve the positional accuracy or extract three-dimensional information of the location of the subject passing through the gate 20. All of the cameras are connected to the computer 42 (shown in FIG. 1) and are used to determine the entrance and exit of the subject through the system.

With reference to FIG. 1, in an embodiment, the computer 42 is arranged to process the video image signals received from at least the video cameras 44, 46 and the electromagnetic signals received from the receiver coils 16. Exemplary processing algorithms executed by the computer 42 are described in detail in later portions of this application.

Further, as shown in FIG. 2, in one embodiment, gate 20 has the following dimensions: a depth 50 of approximately 320 mm, a height 52 of approximately 2026 mm, and a width 54 of approximately 860 mm, which coincide with the x, y, and z-axes, respectively.

In a typical operational scenario at least one of the transmitter coils 12 is energized with a sinusoidally varying AC signal, thereby creating a magnetic field. This magnetic field is modified by electrically conductive or ferromagnetic objects within the field and the resultant field changes are measured with the array of receiver coils 16. In one embodiment, the array of transmitter coils 12 is energized serially and/or sequentially around the object, and for each transmitter coil, the field is measured with each of the receiver coils 16, for determining the electromagnetic properties of the object. Properties such as the polarisability may be measured by using a reconstruction algorithm after combining the resultant detected signals.

In various embodiments the accuracy of the reconstructions are based upon the number and positions of transmitter coils 12 and receiver coils 16. Therefore, in one embodiment, the present application is directed towards systems and methods for assessing the response of a candidate coil configuration. In one embodiment, a processor is configured to quantify both the error in the predicted object position and the error in the predicted magnetic polarisability dyadic of the object as a function of the signal-to-noise ratio (SNR) of the signals from the receiver coils. The error in the predicted position and the predicted magnetic polarisability dyadic can then be assessed for different candidate coil configurations in order to determine the optimum configuration, such as the number of transmitter coils 12 and receiver coils 16; the position of transmitter coils 12 and receiver coils 16; and the geometries of transmitter coils 12 and receiver coils 16. In a preferred embodiment, and the embodiment described in this specification, the coil configuration includes at least eight transmitter coils 12 and at least eight receiver coils 16. It should be understood by those of ordinary skill in the art that any number of transmitter and receiver coils can be used, depending upon the candidate coil configuration characteristics described above and described in greater detail in the paragraphs that follow.

Furthermore, a preferred coil configuration should also have the following characteristics and/or properties. First, it is preferred that all transmitter coils are contained within a panel on one side of the gate while all the receiver coils are contained within a panel on the opposite side of the gate. This allows the transmitter and receiver circuitry to be separated and allows for the minimization of unwanted capacitive crosstalk.

Second, it is preferred that all transmitter and receiver coils are gradiometer wound, with equal areas of clockwise and counterclockwise windings. This coil geometry is well-known by those skilled in the art, because the coil geometry helps to minimize both external electromagnetic interference picked up by the receiver coils and external electromagnetic interference generated by the transmitter coils.

Third, it is preferred that the background coupling (i.e. the mutual magnetic coupling when no object is present) between any transmitter and any receiver coil pair is virtually zero.

Fourth, it is preferred that the coil array is insensitive to mechanical movement of the array, and, in particular, displacement in the Y-Z plane (the plane perpendicular to the walkthrough direction, as shown in FIG. 2) as the gate has the lowest shear stiffness in this particular plane. This is an important consideration because an array with greater stiffness is less sensitive to mechanical vibrations that are transmitted through, for example, the floor. In an extreme case, mechanical vibrations may also be transmitted by a person that accidentally bumps into the gate as he/she walks through it.

Fifth, it is preferred that neighboring transmitter and neighboring receiver coils have near zero net mutual magnetic coupling as this helps to ensure good isolation between adjacent channels and minimize crosstalk. This property is more important if the coils are resonated because resonant currents would otherwise be able to induce a voltage in their neighboring coils.

Sixth, it is preferred that the transmitter coils are collectively able to excite the object with magnetic field components in all three directions (x, y, and z as shown in FIG. 2). As the object follows any path through the gate in the x direction, the receiver coils are simultaneously and collectively able to detect the magnetic field components produced by the object in all three directions.

Figure 3A:
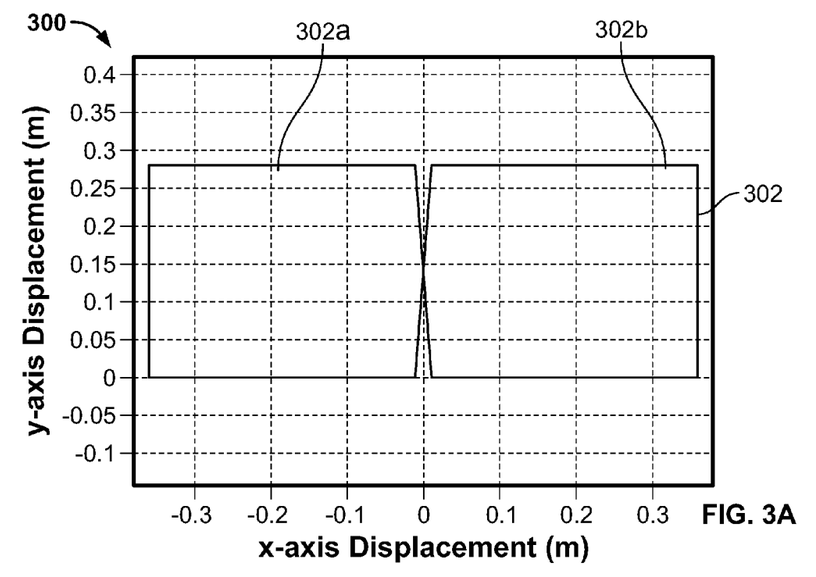
FIG. 3A is a graph showing transmitter coil geometry in two-dimensional space, in accordance with one embodiment.
Figure 3B:
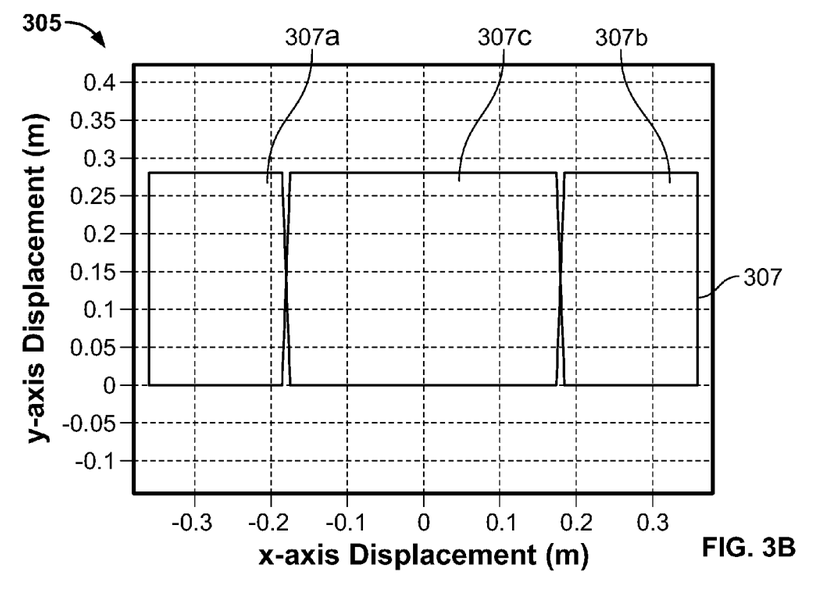
FIG. 3B is a graph showing receiver coil geometry in two-dimensional space, in accordance with one embodiment.

FIGS. 3A and 3B are graphical illustrations of a coil configuration having the characteristics outlined above, showing both transmitter coils and receiver coils, respectively.

FIG. 3A illustrates a transmitter coil geometry in two-dimensional space, in accordance with an embodiment of the present invention, showing the position of the wires of one transmitter coil in both the x-axis (in meters) and the y-axis (in meters) on a grid 300. As shown, the coil 302 is constructed in the shape of a squared-off figure eight having two symmetrical half-sections 302a and 302b, where one half-section is wound in a clockwise direction and the other half-section is wound in a counterclockwise direction. As shown in FIG. 2, the x-direction is horizontal and in the walk-through direction of the portal, whereas the y-direction is vertical.

FIG. 3B illustrates a receiver coil geometry in two-dimensional space, in accordance with one embodiment. FIG. 3B shows the position of the wires of one receiver coil in both the x-axis and the y-axis on a grid 305. As shown, the coil 307 is wound in three sections, where two outer sections 307a and 307b are wound in a direction opposite to a central section 307c.

Figure 3C:
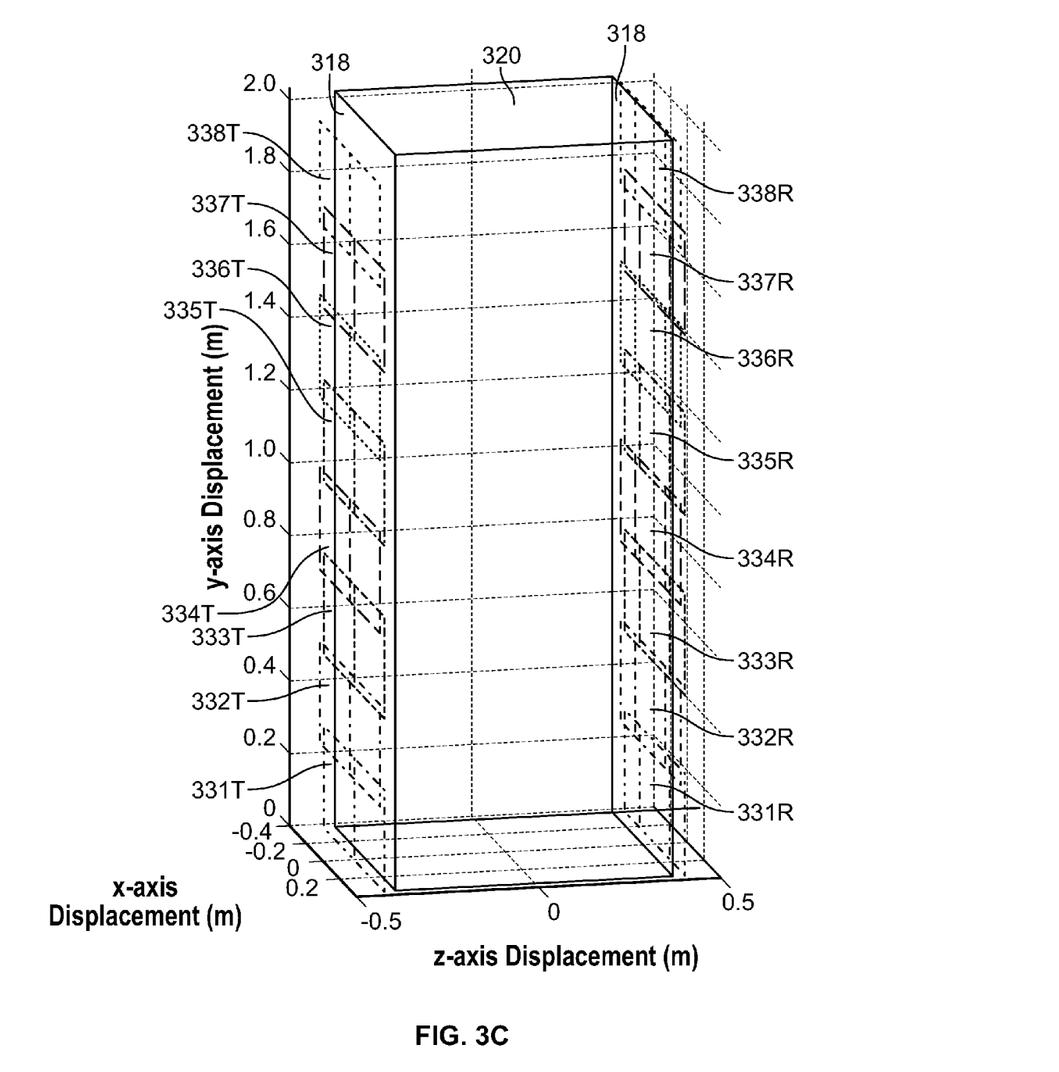
FIG. 3C is a graph showing both transmitter and receiver coil geometry in three-dimensional space, including appropriate portal dimensions, in accordance with one embodiment.

FIG. 3C is a graphical illustration showing eight individual transmitter coils (331T, 332T, 333T, 334T, 335T, 336T, 337T, 338T) and eight individual receiver coils (331R, 332R, 333R, 334R, 335R, 336R, 337R, 338R) mounted in the side panels 318 of the portal 320 in three-dimensional space. As illustrated in FIG. 3C, the receiver coils overlap one another to ensure that neighboring receivers have near zero net mutual coupling. Also, adjacent transmitter coils are overlapped in a similar manner to ensure that neighboring transmitters have near zero net mutual coupling. This feature of the transmitter and receiver coil array helps to avoid interference between neighboring coils, especially when the coils are resonated with tuning capacitors.

In an embodiment, the transmitter and receiver coils are gradiometer wound as described above with respect to the preferred properties of the coil configuration. Thus, the transmitter and receiver coils have equal areas of clockwise and counterclockwise windings. This coil geometry is well-known to those of ordinary skill in the art, as it helps to minimize both external electromagnetic interference picked up by the receiver coils and external electromagnetic interference generated by the transmitter coils. The gradiometer winding configuration ensures that the magnetic field produced by a transmitter coil drops off very quickly to zero outside the gate as the magnetic field produced by the counterclockwise section of winding cancels the field produced by the clockwise section of winding. Hence, the transmitter coil produces little interference to other walk-through metal detectors that may be positioned in the vicinity. Similarly, the gradiometer winding configuration ensures that the receiver coils are relatively immune to pick-up from the distant sources of electromagnetic interference by reciprocity.

In various embodiments, the transmitter and receiver coils are designed in a manner so as to expose an object to x, y, z magnetic field components as the object passes through the gate of the detection system of the present invention. Also, in an embodiment, the transmitter and receiver coils are configured in an array for near zero background coupling and for low susceptibility to mechanical movement, especially shear strain on the gate.

With reference back to FIG. 1, the video image signals received from at least the video cameras 44, 46 and the electromagnetic signals received from the receiver coils 16, which are input to the computer 42, are fed to a processor executing reconstruction instructions. In an embodiment, the reconstruction instructions are written in MatLab. In other embodiments, the algorithm may be coded in any suitable programming language. The reconstruction instructions are executed by the computer 42 to estimate the position and the magnetic properties (eg. magnetic polarisability dyadic) of a metallic object by using the data collected from the object as it travels through the gate 20 of the detection system 100.

A characteristic data set for each detected object may be a characteristic of each detected object together with a sequence of coordinate points or other suitable parameters that describe the path that each object has traveled either through or across the sensing region of the detection system. In an embodiment, a complex magnetic polarisability dyadic is used to suitably characterize the object. A magnetic polarisability dyadic describes the three-dimensional scattering effect of the object to the applied magnetic field. In various other embodiments, other similar characteristics of detected objects may be used, and thus, the present application is not limited to the representation described herein.

In one embodiment, the detection system is configured to generate an alarm for a predefined type of object based on one or more parameters in the characteristic data for the object. A classification method may be applied to the characteristic data for this purpose. The classification method is used to determine which category the object belongs to, for example, either a threat object or an innocuous object. If any detected object falls in the threat category, an alarm is activated. As is evident to those of ordinary skill in the art, various other object categories could be defined and used by operators for particular classification purposes.

In one embodiment, a plurality of measurements captured simultaneously from the transmitter and receiver coil combinations are defined as a 'set of measurement signals'. For the gate shown in FIG. 3C, the eight transmitter coils and eight receiver coils result in 64 possible independent measurement signals (8×8). However, signals from transmitter coils to receiver coils that are located far from the transmitter coils have little sensitivity to metal objects and consequently are ignored. So in this particular embodiment, the 'set of measurements signals' is limited to 34 measurements as summarized in the table below:

TABLE 1

Measurements Derived From Coil Pairings

| Transmitter Coil | Couples to Receiver Coils | Number of Measured Coil Pairs |
| --- | --- | --- |
| 331T (bottom of gate) | 331R, 332R, 333R | 3 |
| 332T | 331R, 332R, 333R, 334R | 4 |
| 333T | 331R, 332R, 333R, 334R, 335R | 5 |
| 334T | 332R, 333R, 334R, 335R, 336R | 5 |
| 335T | 333R, 334R, 335R, 336R, 337R | 5 |
| 336 T | 334R, 335R, 336R, 337R, 338R | 5 |
| 337 T | 335R, 336R, 337R, 338R | 4 |
| 338T (top of gate) | 336R, 337R, 338R | 3 |
| TOTAL | | 34 |

The size of the set of measurement signals affected the error in the predicted positions and the predicted magnetic polarisability dyadic of the object. The size of the set of measurement signals also affects the number of objects that can be simultaneously reconstructed, which, in this particular embodiment, is typically 4 or less. It should be noted herein that the 34 measurement signal sets represent a lower limit of the number of signals sets that can be measured. In other embodiments, a greater number of coils and thus, a greater number of measurement signal sets are preferred. Therefore, in preferred embodiments, at least 34 measurement signal sets should be obtained.

The set of measurement signals are time varying and change as one or more metal objects pass through the gate. Each measurement signal is sampled at a rate of 100 samples per second, which gives adequate temporal resolution for objects passing through the gate at walking speed or less. Consequently there are 100 sample instants per second for each measurement signal in this exemplary embodiment of the present invention.

For every sample instant, the x, y, and z coordinates that indicate the location and the magnetic polarisability dyadic of the object being scanned, are calculated using a reconstruction process. Since the measurement signals consist of a sequence of samples (100 per second in this example), then a sequence of x, y, and z coordinates are calculated by the reconstruction process together with an estimation of the magnetic polarisability dyadic of the metallic object. If there is more than one metallic object then the reconstruction algorithm can be extended to calculate multiple x, y, and z coordinate sequences and multiple magnetic polarisability dyadic, with one x, y, and z sequence and one dyadic per object.

In one embodiment, an iterative process is used to invert data where the position and properties of an object are estimated simultaneously by minimizing a residual, as shown below in Equation 3 between the measured data and a calculated data produced by a solution to the forward problem. The forward problem refers to the process of calculating the estimated values of the measurement signals, if the position and dyadic of each object are known. The residual represents the square of the error between the estimated measurement signals and the actual measurement signals. When the residual is zero, there is no error between the estimated and actual measured signals and therefore the x, y, and z positions and dyadic for each metallic object is calculated exactly.

An exemplary magnetic polarisability dyadic is depicted as M below. The dyadic M is a fundamental property of the metallic object, which is dependent on its metallic composition, shape and orientation. The dyadic M has 9 complex numbers, with each complex number representing the phasor response of the object in a particular direction (x, y, or z) to the component (x, y, or z) of the magnetic field, which has been applied to the object. Reciprocity of electromagnetic induction stipulates that the dyadic, M, should be diagonally symmetrical as shown in Equation 1. Therefore the magnetic polarisability dyadic, M, has 6 independent complex values. Furthermore, since each independent complex value has 2 scalar components (Real and Imaginary) and there are 3 positional values (x, y, z), which makes the number of variables to calculate by the reconstruction algorithm as 15 for each sample instant and each metallic object:

$$\overleftrightarrow{M} = \begin{bmatrix} m_{11} & m_{12} & m_{13} \\ m_{21} & m_{22} & m_{23} \\ m_{31} & m_{32} & m_{33} \end{bmatrix}$$ [EQUATION 1]

where $m_{12} = m_{21}, m_{13} = m_{31}, m_{23} = m_{32}$

In various embodiments, from the 34 measurements only a small number, less than the number of variables required to be inverted, typically have signal levels above the noise levels. This makes the problem ill-posed. In order to improve the condition of the problem, it is assumed that the value of M does not change with time and more sets of measurements that have been taken in different instances are added to it.

In various embodiments, as described above, the forward problem calculates the estimated values of the measurement signals, if the position and dyadic of each metallic object are known. The accuracy of the forward problem is important for the convergence of the iterative reconstruction process. The reconstruction algorithm takes the dot product of magnetic polarisability dyadic, the magnetic field produced by the transmitting coil and the magnetic field produced by the receiving coil when it is supplied with unit current, which can be expressed as:

$$F_{ij} = (\overleftrightarrow{M} \cdot H_i(x)) \cdot H_j(x)$$ [EQUATION 2]

where, F is the forward problem, H the magnetic field and x is the coordinate's vector. The indices i and j indicate the transmitter and receiver number respectively. The magnetic fields are pre-computed for all the coils and the volume of the gate on a grid with 10 mm spacing.

In one embodiment, before operation, the detection system is calibrated in order for the forward problem and the measurements taken by the transmitter and receiver coils to be matched. The calibration factor is a set of complex numbers which adjusts magnitude and phase of each measurement value. In an exemplary embodiment, a calibration object consisting of a 38 mm diameter spherical ball filled with ferrite powder is passed through a vertical tube in a specific location on the detection system. The forward problem (i.e. a routine that calculates the estimated values of the measurement signals, when the position and dyadic of the object are known) is solved for the ball's location and magnetic polarisability dyadic. Then, for every coil combination a complex factor that best fits the measurements to the forward problem is computed. The magnetic polarisability dyadic of the calibration object is taken to be the unity matrix as a reference.

During the operation of the detection system of the present invention, when an alarm is triggered, the measurements from the 34 coil combinations are imported into the reconstruction algorithm. From each channel combination, a fixed length of 200 measurements (approximately 2 s) is recorded. A background or DC offset is subtracted from each channel end and a trigger level is used to select the region where there is at least a predefined level of signal to noise ratio.

In one embodiment, a first estimation of the position of the object is obtained using an empirical algorithm. At least one signal from one or more straight-coupled channels are used to estimate the height of the object, while the cross-coupled channels are used to estimate the horizontal z-coordinate of the object. The straight coupled channels are defined as having the transmitter coils and receiver coils directly facing and corresponding with each other, such as for instance, transmitter coil 331T with receiver coil 331R, or transmitter coil 332T with receiver coil 332R, or transmitter coil Tn with receiver coil Rn using the coil numbering convention shown in TABLE 1 earlier. Similarly, the cross-coupled channels are at angles to each other and consist of transmitter coil n with receiver coil m, where n is not equal to m.

A walking speed is taken to be the same for every walk as a first estimate. Estimated position points, having a fixed distance between them, comprise the object's trajectory along the X axis and are taken to be central to the gate of the detection system. Finally, an assumed magnetic polarisability dyadic, such as the unity matrix, is taken as a starting point.

A modified Levenberg-Marquardt method produces the least squares solution of the non-linear problem:

$$\arg \min(\|D-F(x,\overleftrightarrow{M})\|^2)$$ [EQUATION 3]

where D is a measurement vector. The forward problem is solved for the latest coordinates and polarisability to find a coil signal as well as a gradient of the received signal when any of the unknown variables are perturbed. Then a residual R is computed and Jacobean J is populated with gradients. The solution of the problem is given by:

$$[x,\overleftrightarrow{M}] = (J^T J + \lambda L^T L)^{-1} J^T R$$ [EQUATION 4]

where $R=D-F(x,\overleftrightarrow{M})$, $\lambda$ is a regularization parameter and L depicts a regularization matrix. If the new coordinates found are to be outside of the volume of the portal, then the regularization parameter is increased and the problem is solved again. The process is repeated iteratively until the residual stops decreasing or the residual becomes lower than the tolerance or the regularization reaches a maximum value.

In one embodiment, the detection system is a security detection system in which the transmitter and receiver coils are mounted on support means arranged to allow a person to walk through the imaging area. The processing means may be arranged to generate a plurality of sets of data as an object moves through the imaging area, and to combine the sets of data to form a resultant data set. The object may, for example, be a person together with their clothing and any articles they are carrying with them.

In one embodiment, the detection system comprises movement sensing means arranged to measure the position of at least a part of an object, for example relative to either the transmitter or detector coils or another part of the object. The movement sensing means may be arranged to use the changes of position when combining sets of data. The movement sensing means may be a video camera or other imaging systems, or may comprise other forms of sensor such as light sensors.

In one embodiment, the detection system uses the movement sensing means to show the location and, if desired, the category of a metal object passing through the detection system. For example, the output of the detection system may be a video or photograph of a person being screened. Superimposed on this video or photograph may be a graphical representation of the characteristics of detected object encoding the eigenvalues of the magnetic polaris ability dyadic together with the location.

Also, in one embodiment, the detection system uses the movement sensing means to enhance the operation of the reconstruction process. For example, the detected object must be associated with a fixed position on the object as the object passes through the detection system; for instance a subject wearing a metal wrist watch will produce a detected object which should be located on the wrist. The co-location of detected object in the magnetic data and visual data is used to enhance the operation of the reconstruction process or verify the results of the reconstruction process.

Further, in another embodiment, the detection system comprises displacement sensing means arranged to detect displacement of a part of the object away from a reference position, and to correct for the displacement when combining sets of data. This sensing means may also comprise an imaging system, such as a video camera, or other forms of sensors. The reference position may be a position relative to at least a part of the object. The displacement may be a displacement relative to at least a part of the object.

Figure 4:
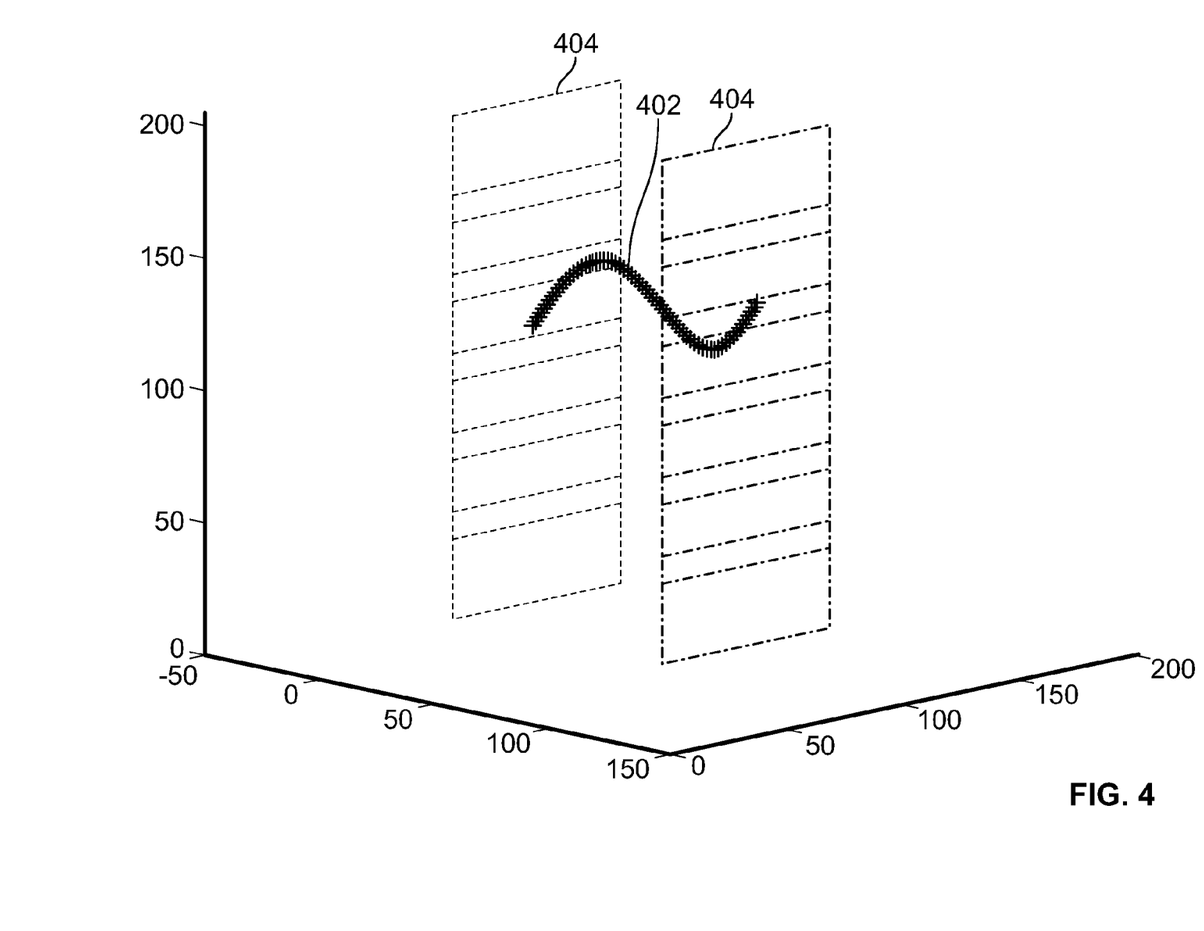
FIG. 4 is a graphical illustration of an exemplary output of a reconstruction algorithm used in conjunction with a detection system of the present application.

FIG. 4 illustrates an exemplary output of a reconstruction process used in conjunction with the detection system, in accordance with an embodiment of the present invention. FIG. 4 illustrates the 3D coordinate sequence 402 of a metal object as it passes through the gate 404 of the detection system of the present invention.

Figure 5:
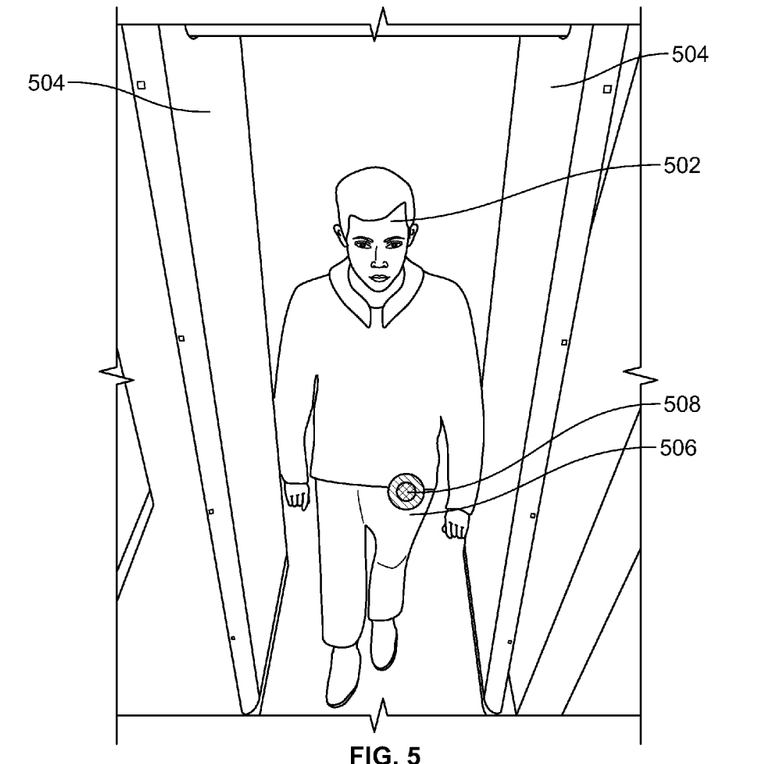
FIG. 5 illustrates an exemplary visual output of the detection system, superimposed upon a subject under inspection, in accordance with one embodiment.

FIG. 5 illustrates an exemplary visual output of the detection system, in accordance with an embodiment of the present invention. Here the position of a metal object is superimposed upon a person 502 walking through the gate 504 of the detection system of the present invention. In this case the person 502 is carrying a ferritic steel penknife in the left trouser pocket 506 with the blade pointing in a vertical direction. As can be seen in FIG. 5, the reconstruction process has located the position of the knife as shown by the circles 508 superimposed on the image of the person 502. In an embodiment, the circle 508 may be used to track the location of the metal object on a video stream of the person 502 walking through the gate 504.

Figure 6:
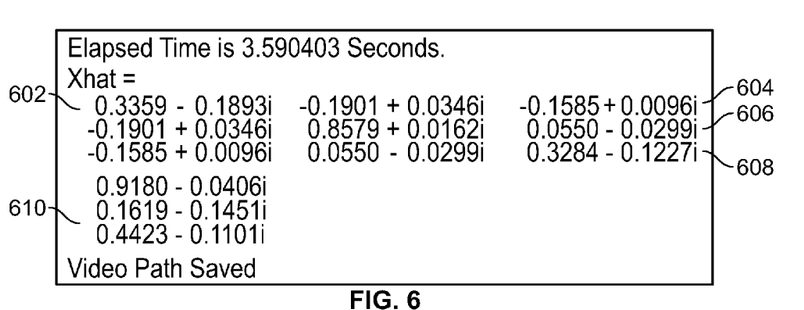
FIG. 6 illustrates a complex magnetic polarisability dyadic calculated from the reconstruction algorithm, in accordance with one embodiment.

FIG. 6 illustrates a complex magnetic polarisability dyadic calculated from the reconstruction process, in accordance with an embodiment of the present invention. The FIG. illustrates a magnetic polarisability dyadic, which is a 3×3 matrix 602 of complex numbers that is symmetrical about a diagonal. The magnetic polarisability dyadic describes an x, y and z response to applied field in the x-direction respectively for the terms in row 604; the x, y and z response to the applied field in the y-direction respectively in row 606; and the x, y and z response to the applied field in the z-direction respectively in row 608. In various embodiments, reciprocity of electromagnetic induction ensures that the matrix 602 is diagonally symmetrical. The values in the matrix 602 are calibrated against a circular spherical ferrite powder calibration object. As illustrated the largest value is 0.8579 in the middle position (y-excite, y-detect) indicating a ferromagnetic object. The values depicted in section 610 in FIG. 6 are eigenvalues of the magnetic polarisability dyadic. These values are unique characteristics to the object passed through the gate of the detection system of the present invention, and can be fed into a classification algorithm to separate known innocuous metal objects from known threat metal objects.

Figure 7:
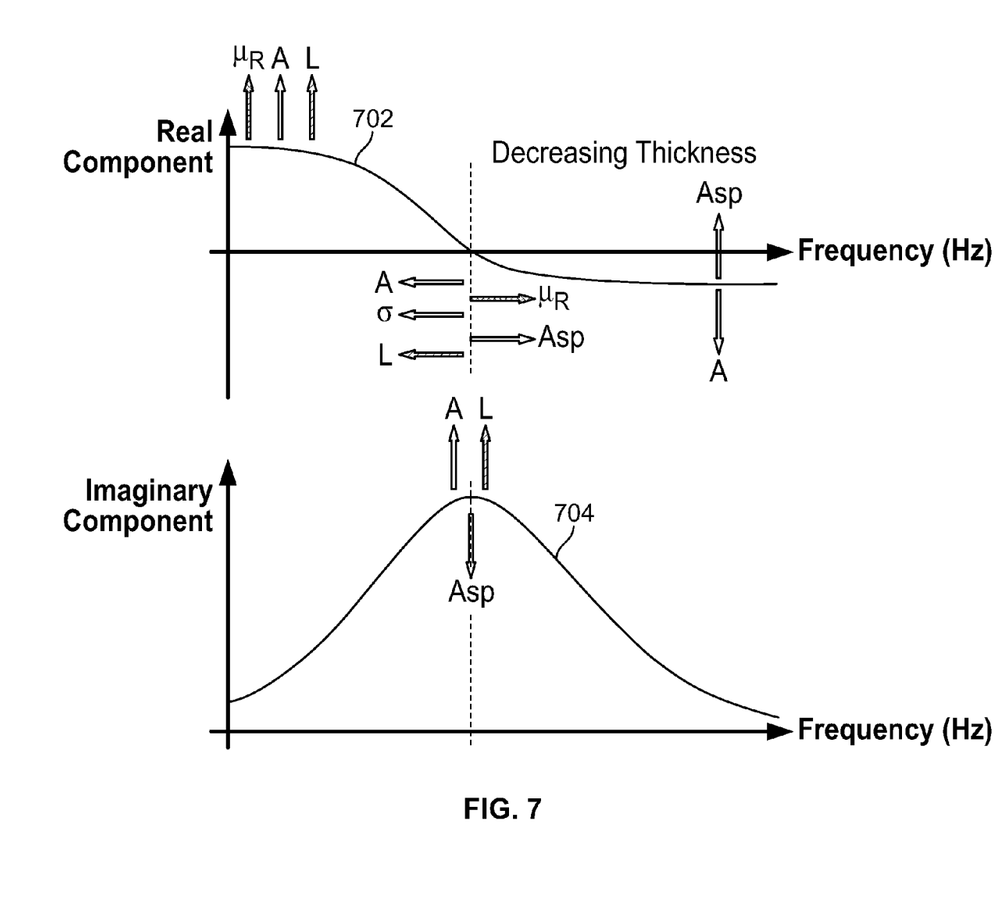
FIG. 7 is a graph showing a typical spectrum of an eigenvalue of the complex magnetic polarisability dyadic illustrated in FIG. 6.

In an embodiment, a range of frequencies are applied to the transmitter and receiver coils of the detection system and the coupling versus frequency on the full array of coil pairs is measured. In one embodiment, the range of frequencies is between 5 kHz and 50 kHz. The range of frequencies chosen takes into consideration those frequencies for which typical metallic threat objects, such as knives and guns, exhibit significant changes in their electromagnetic response as characterized by changes in their magnetic polarisability dyadic. The range of frequencies is applied simultaneously via a suitable waveform. The individual signal components at each frequency are extracted using demodulation techniques well known to those skilled in the art of signal processing. The three eigenvalues of the magnetic polarisability dyadic for a metal object is calculated for each frequency by extending the reconstruction algorithm described earlier to produce a spectrum for each. FIG. 7 illustrates a typical spectrum of an eigenvalue of the complex magnetic polarisability dyadic illustrated in FIG. 6. The spectrum further characterizes the metal object as shown in FIG. 7, which contains both the real and imaginary components of the eigenvalue plotted against frequency, shown as 702 and 704, respectively.

The spectrum for each eigenvalue is used to improve the estimation of the classification algorithm described above because the shape of the curve is a function of the material properties of the object (magnetic permeability $\mu_R$ and electrical conductivity $\sigma$) and the size (area, A, length L) and shape (aspect ratio Asp) of the object. Consequently different types of object will have different spectral characteristics.

At low frequencies, the imaginary component of the eigenvalue is approximately zero as the magnetic field is not alternating frequently enough to induce sufficient eddy currents into the metallic object. At low frequencies, the real component of the eigenvalue is determined by the magnetic properties of the object, such as the relative permeability $\mu_R$ of the material making up the object. Magnetic objects with a large cross-sectional area, A, or length, L, will also have a large real response at low frequencies. At very high frequencies, the magnetic field changes sufficiently fast to ensure that all the induced eddy current flows are virtually on the surface of the metal object and no electromagnetic field penetrates inside. As a result, the imaginary component of the eigenvalue is also zero, but the real component of the eigenvalue is negative and abject with a large cross-sectional area and thus, will have a more negative response, while objects with a small aspect ratio, Asp, will have less effect. At intermediate frequencies the real component changes from being positive to negative for magnetic metallic objects and the imaginary component passes through a peak in magnitude.

Hence, the present application discloses a detection system which characterizes and locates one or more metal objects in a three-dimensional space by using electromagnetic characteristics of the objects. It will be appreciated that various above-disclosed embodiments, other features and functions, or alternatives thereof, may be desirably combined into many other different systems or applications.

The above examples are merely illustrative of the many applications of the system of present invention. Although only a few embodiments of the present invention have been described herein, it should be understood that the present invention might be embodied in many other specific forms without departing from the spirit or scope of the invention.

Therefore, the present examples and embodiments are to be considered as illustrative and not restrictive, and the invention may be modified within the scope of the appended claims.

We claim:

1. A detection system for locating and characterizing an object within a detection area in a three-dimensional space comprising:
   a plurality of magnetic field generators, comprising a plurality of transmitter coils, arranged on at least a first side of the detection area;
   a plurality of magnetic field detectors, comprising a plurality of receiver coils, arranged on at least a second side of the detection area, wherein the second side is opposite to the first side;
   a control system for generating a magnetic field in the detection area by the magnetic field generators and for measuring a modified magnetic field at each of the magnetic field detectors, wherein the generated magnetic field is modified by the object; and
   at least one processor configured to process the measured modified magnetic field to obtain a data set characterizing the object and a location of the object, wherein said at least one processor is configured to execute a plurality of instructions defining a reconstruction process on a predefined number of measurements of the modified magnetic field, wherein the plurality of transmitter coils and the plurality of receiver coils has been configured by quantifying an error in a predicted object location and an error in a predicted magnetic polarisability dyadic of the object as a function of a signal-to-noise ratio (SNR) of signals from the receiver coils and wherein said errors are used to configure said physical coil configuration.

2. The detection system of claim 1 further comprising an alarm generation unit for generating an alarm corresponding to at least one predefined type of object based on one or more parameters in the characteristic data of the object, wherein the alarm generation unit is adapted to execute a classification process for determining the type of the object based on one or more predefined categories associated with the object.

3. The detection system of claim 1 further comprising a movement sensor arranged to measure a position of at least a first part of the object relative to at least one of the magnetic field generators, the magnetic field detectors, or another part of the object, wherein the measured position is combined with the data set characterizing the object.

4. The detection system of claim 3 wherein the movement sensor comprises a motion sensor or a video camera.

5. The detection system of claim 3 wherein the movement sensor comprises a light sensor.

6. The detection system of claim 3 wherein the movement sensor produces a visual output displaying one or more of a measured position and a category of the object passing through the detection area, wherein the visual output is obtained by combining a photographic image of the object with at least a portion of the data set characterizing the object and the measured position of at least a part of the object.

7. The detection system of claim 1 further comprising a displacement sensor configured to detect a displacement of at least a part of the object away from a reference position, and to correct for the displacement when processing sets of measurements of the modified magnetic field, wherein the reference position is relative to at least a part of the object and the displacement is relative to at least a part of the object.

8. The detection system of claim 1 wherein the object is a conductor of electricity.

9. The detection system of claim 1 wherein the object is a ferromagnetic object.

10. The detection system of claim 1 wherein the magnetic field generators comprise electrical conductor coils through which electric current is passed to generate magnetic field.

11. The detection system of claim 1 wherein the magnetic field detectors comprise electrical conductor coils in which electric current is generated due to changes in a magnetic field.

12. The detection system of claim 1 wherein the magnetic field detectors are solid state magnetometers.

13. The detection system of claim 1 wherein the at least one processor reconstructs a path followed by the object in three dimensional space.

14. The detection system of claim 1 wherein the control system generates a magnetic field by generating electrical current in the magnetic field generators and measures the magnetic field at each of the magnetic field detectors by detecting induced signals in the detectors.

15. The detection system of claim 1 wherein the control system comprises:
   one or more data acquisition and conditioning electronics for collecting conditioned signals from the magnetic field detectors; and
   at least one processor for possessing the collected conditioned signals to generate images.

16. The detection system of claim 1 further comprising at least one processor adapted to process at least a video signal obtained from one or more video cameras placed around the detection area.

17. The detection system of claim 1 wherein the data set for characterizing the object comprises one or more electromagnetic properties of the object and a sequence of coordinate points that describe a path the object has traveled inside the detection area.

18. The detection system of claim 1 wherein the data set for characterizing the object comprises a complex magnetic polarisability dyadic of the object, wherein the magnetic polarisability dyadic describes a three-dimensional scattering effect of the object with respect to the generated magnetic field.

19. The detection system of claim 1 wherein the magnetic field generators and detectors are each configured in an array for obtaining near zero background coupling and low susceptibility to mechanical movement.

* * * * *